United States Patent [19]

Wörner et al.

[11] Patent Number: 4,516,955

[45] Date of Patent: May 14, 1985

[54] INSTALLATION FOR DAMPING VIBRATIONS IN THE DRIVE TRAIN OF A MOTOR VEHICLE

[75] Inventors: Günter Wörner, Kernen; Franz Kosik, Ostfildern; Hartmut Gösele, Stuttgart, all of Fed. Rep. of Germany

[73] Assignee: Daimler-Benz Aktiengesellschaft, Fed. Rep. of Germany

[21] Appl. No.: 413,150

[22] Filed: Aug. 30, 1982

[30] Foreign Application Priority Data

Aug. 29, 1981 [DE] Fed. Rep. of Germany ....... 3134310

[51] Int. Cl.³ .................... F16F 15/12; F16F 15/14
[52] U.S. Cl. .................................. 464/89; 74/574; 464/180
[58] Field of Search .................. 74/574; 188/378, 379; 464/87, 89, 93, 180

[56] References Cited

U.S. PATENT DOCUMENTS

| | | |
|---|---|---|
| 3,630,049 | 12/1971 | Feller et al. ................ 464/93 |
| 4,077,233 | 3/1978 | Hörnig et al. ............... 464/89 |
| 4,114,472 | 9/1978 | Hörnig et al. ............. 464/89 X |

FOREIGN PATENT DOCUMENTS

| | | |
|---|---|---|
| 2744051 | 4/1979 | Fed. Rep. of Germany ........ 74/574 |
| 2933586 | 2/1981 | Fed. Rep. of Germany ...... 464/180 |

*Primary Examiner*—John Petrakes
*Assistant Examiner*—Daniel P. Stodola
*Attorney, Agent, or Firm*—Craig and Burns

[57] ABSTRACT

An installation for damping vibrations in the drive connection of a motor vehicle by a vibration absorber which includes, in coaxial arrangement with the cardan shaft, an annular vibrating mass, a carrier flange adapted to be secured to the cardan shaft, and a resilient body of an elastomeric material which effects the vibration coupling of the vibrating mass with the carrier body of the carrier flange; stiffening elements are inserted into the resilient body which serve as stiffening elements effective in the radial direction; additionally apertures are provided in the resilient body on both sides of the stiffening elements which enable an intentional reduction of its torsional stiffness so that a resonant frequency rate $f_r/f_t$ of 2.5 or more can be realized for the vibration absorber.

11 Claims, 5 Drawing Figures

INSTALLATION FOR DAMPING VIBRATIONS IN THE DRIVE TRAIN OF A MOTOR VEHICLE

The present invention relates to an installation for damping vibrations in the drive train of a motor vehicle, by means of a vibration absorber.

Installations of this type serve the purpose of suppressing, to the greatest possible extent, torsional and flexural vibrations which occur, in particular, at a cardan shaft connecting the transmission block of a motor vehicle to the driven axle thereof, in order to combat, in an effective manner, the noise development and wear which are produced in the drive train by vibrations of this nature.

Torsional vibrations are excited as a result of the fact that the output torque of an internal combustion engine of conventional construction is subject to periodic fluctuations, the frequency of which is equal, in a four-cylinder reciprocating-piston engine taken as a typical example, to twice the rotational frequency of its crankshaft, while flexural vibrations are excited essentially by the inertia forces of the drive unit, which act radially with respect to the longitudinal axis of the crankshaft; in the case of the four-cylinder drive unit, the excitation frequency for both torsional and flexural vibrations corresponds to twice the frequency at which the crankshaft rotates.

Typical vibrations in the chassis structure, which can be excited, in a resonant manner, by torsional vibrations of the crankshaft, for example, upward and downward movements of the rear-axle structure relative to the vehicle floor, have natural frequencies in the 60 Hz range and must therefore be combatted by a vibration absorber having a resonant frequency for torsional vibrations which lies in approximately this frequency range. Other vibrations, which can be excited, in particular, by flexural vibrations of the cardan shaft and which manifest themselves as flexural deformations of parts of the axle attachment system, for example, as deformations of the rear-axle saddle or subframe, have typical natural frequencies of, for example, 150 Hz, and for combatting these vibrations therefore require that the vibration absorber exhibits a resonant frequency for flexural vibrations which lies approximately at this frequency value.

This means that in a vibration absorber which is suitable for the aforementioned purpose, the ratio $f_r/f_t$ of its resonant frequency $f_r$ for transverse respectively radial-vibrations to its resonant frequency for torsional vibrations $f_t$ should amount, in practice, to a value of about 2.5:1.

In an installation of the aforementioned type, known from the German Offenlegungsschrift No. 2,933,586, the vibration absorber which is connected to the cardan shaft, includes a carrier-flange adapted to be attached to the coupling-flange of the cardan shaft of the motor vehicle and constructed in the shape resembling a short triangular prism, whose—rounded-off—prism-edges extend parallel to the longitudinal axis of the cardan shaft which passes through this carrier-flange. The vibrating mass or weight is constructed in the form of a circular ring and is arranged coaxially to the cardan shaft, respectively, the carrier-flange, whereby a clearance remains between the vibration mass and the prism-edges of the carrier-flange when the vibrating mass is in its normal non-deflected position. The vibrating mass is connected to the respective oppositely disposed prism-surfaces of the carrier-flange by way of two rubber-elastic, approximately column-shaped resilient bodies. These resilient bodies are so constructed and arranged that, in the region of the longitudinal edges of the carrier-flange, slots extending in the circumferential direction remain between the carrier flange and the vibrating mass which are somewhat widened at their ends delimited by the resilient bodies. Stiffening elements, in the form of U-sections or also in the form of pieces of profile material having an endless profile cross section, i.e., a cross section closed in itself, are inserted between the resilient bodies connecting a respective one of the prism surfaces with the vibrating mass, whereby, as seen in the radial direction, slots extending in the circumferential direction or along the carrier flange surfaces are left open between these stiffening elements and the vibrating mass, respectively, the carrier-flange, which slots are also widened somewhat at their ends.

Compared to a vibration absorber in which, except for the slots provided in the area of the corners of the carrier-flange, the sector-shaped spaces between the vibrating mass and the prism-surfaces of the carrier-flange are completely filled with the rubber-elastic material of a resilient body, the construction of the vibration absorber as described above enables the attainment of an increased wear-resistance of the resilient bodies, which effect the vibration-coupling of the carrier-flange to the vibrating mass; however, this prior art construction entails thereby the disadvantage that, on the one hand, the force-constant which determines the torsional vibrations, and therewith the resonant frequency of the torsional type of vibration is increased by the stiffening elements and, on the other hand—owing to the reduction in the volume of the resilient body resulting from the arrangement of the stiffening elements—the force-constant which determines the radial vibrations of the vibrating mass or weight is decreased and therewith the resonant frequency of the radial type of vibration is reduced. Consequently, it is not possible with this prior art vibration absorber to fulfill under practical conditions the requirement mentioned hereinabove with respect to the ratio of the resonant frequencies of the flexural and torsional vibrations.

Accordingly, it is the principal object of the present invention to provide an installation of the type described above, whose vibration absorber exhibits a favorably large ratio of its resonant frequencies for flexural and torsional vibrations, accompanied by an equally good wear-resistance of its resilient body.

The underlying problems are solved according to the present invention in that the reinforcing elements are constructed as bushes or sleeves extending in the axial direction of the shaft, which as viewed in radial direction are arranged between outer bridges of the resilient body on the side of the vibration mass and inner bridges of the resilient body on the side of the carrier-flange, and in that, as seen in the direction of rotation of the shaft, apertures are provided in the resilient body on both sides of the stiffening elements, which apertures reduce the torsional stiffness thereof.

By means of the stiffening elements which as seen in radial direction, are thus arranged between bridges of the elastic resilient body, on the side of the vibrating mass and on the side of the carrier-flange, it is possible to increase in a defined manner the stiffness of the elastic resilient body in the radial direction, whereas by means of the apertures which, as seen in the circumferential direction, are located on both sides of the stiffening elements, it is possible to keep the torsional stiffness of the resilient body sufficiently low, so as to be able, on the one hand, to adjust its resonant frequency for torsional vibrations to a low value as required, and, on the other hand, to attain in the vibration absorber, a desired high ratio of its resonant frequencies for radial and torsional vibrations. Moreover, the construction of the vibration absorber according to the present invention also assures an adequate wear-resistance of its resilient body.

Vibration absorbers are admittedly known from the German Offenlegungsschrift No. 25 08 212, in which for the purpose of a reduction of the resonant frequency for torsional vibrations, the resilient body is provided with bores in its solid areas. However, not only the resonant frequency for torsional vibrations, but also the resonant frequency for radial vibrations of the vibration absorber is reduced by such bores or apertures in the resilient body, and it is therefore not possible in practice to achieve a desired increase in the ratio $f_r/f_t$ with such prior art device.

In principle the stiffening elements can be cast or vulcanized into the resilient body consisting of a suitable elastomer already during the manufacture thereof. However, it is advantageous if the stiffening elements are pressed-in into apertures of the elastomeric resilient body in such a manner that the resilient body abuts or bears against the cylindrical surface of the stiffening elements with a prestress sufficient for fixing the stiffening elements in correct position thereof.

The stiffening elements can be secured against axial movements inside of the resilient body, as required in this case, if the sleeve-shaped stiffening elements are provided with flanges formed integrally with their end faces, or if the sleeve-shaped stiffening elements are provided with parts of circular flange-like shape overlapping the ring-shaped end faces thereof.

By giving to the apertures of the resilient body arranged on both sides of the stiffening elements an endless reniform interior cross section or by constructing the apertures arranged on both sides of the stiffening elements as lateral widened bulges or region of the aperture receiving the resilient body it is possible to influence the torsional resistance of the resilient body in an intentional manner coupled with a good wear resistance of the resilient body.

The same is also true if the lateral widened bulges or regions of the apertures of the resilient body receiving the stiffening elements adjoin each other smoothly on the side of the carrier flange tangentially with respect to the cylindrical surface of the reinforcing elements. In that case, the stiffening sleeves are able to roll off along the inner bridge of the resilient body when the vibration absorber is excited into torsional vibrations; the material of the resilient body of this bridge which, as a rule, is relatively thin, is exposed thereby essentially only to a pressure load which again favors the wear resistance of the resilient body.

Finally, according to a further feature of the present invention, the vibration absorber may have a construction of its carrier body of cylindrical shape and a resilient body of circular annular shape so that by a combination of stiffening elements, on the one hand, the torsional resistance, and on the other, the radial stiffness of the resilient body can be intentionally influenced and therewith the ratio of resonant frequencies of the vibration absorber can be adjusted to the desired value.

These and other objects, features and advantages of the present invention will become more apparent from the following description when taken in connection with the accompanying drawing which shows, for purposes of illustration only, one embodiment in accordance with the present invention, and wherein.

Figure 1:
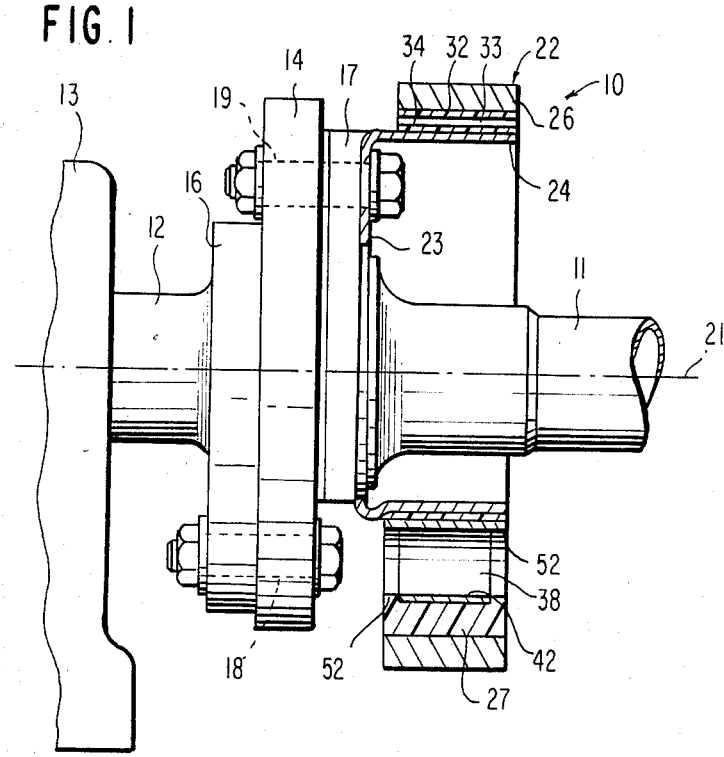
FIG. 1 is an elevational view, partly in axial longitudinal cross section along the axis of the cardan shaft, of an installation according to the present invention for absorbing vibrations with a vibration absorber arranged in the cardan shaft of a motor vehicle, illustrated approximately at a scale of 1:1.5.

Referring now to the drawing wherein like reference numerals are used throughout the various views to designate like parts, and more particularly to FIG. 1, this figure illustrates a part of the drive train or drive connection of a motor vehicle provided with an installation according to the present invention for absorbing vibrations, generally designated by reference numeral 10, whereby the drive train is represented in this embodiment by the end of the cardan shaft 11 on the side of the transmission, the output shaft 12 of the transmission 13 and a flexible coupling disk 14 provided in lieu of a universal joint or cardan joint. On the one hand, the output shaft 12 of the transmission 13 is secured at the coupling disk 14 by means of its isosceles triangularly shaped coupling flange 16, and, on the other, the cardan shaft 11 is secured at the coupling disk 14 with its coupling flange 17 also of isosceles triangular shape by means of three bolts 18 and 19, respectively, arranged in the corner areas of these coupling flanges 16 and 17, whereby the coupling flanges 16 and 17 and the coupling disk 14 are constructed and arranged axially symmetrically with respect to the longitudinal axis of the cardan shaft 11.

A vibration absorber or damper generally designated by reference numeral 22 is a functionally essential component of the vibration damping installation 10, which enables a dynamic opposition both to torsional vibrations occurring in the drive train as also to transverse flexural vibrations which occur in the same transversely to the longitudinal axis 21.

This vibration absorber or damper 22, which will be explained hereinafter in detail by reference to FIG. 1 and to FIGS. 2 to 5, includes a carrier flange 23 constructed as three-armed flange which has an isosceles triangular base shape corresponding to the shape of the coupling flange 17 of the cardan shaft 11. The carrier flange 23 is adjoined in the axial direction by a triangular prism-shaped carrier body 24, by an annular vibrating weight or mass 26 coaxially surrounding the carrier body 24 and by an elastic resilient body 27 connected with the carrier body 24 as also with the vibrating mass 26. The vibrating mass 26, in its turn is adapted to be excited by way of the elastic, resilient body 27 into torsional vibrations and/or transverse vibrations extending at right angle to the longitudinal axis 21, by means of which the dynamic damping of such vibrations is made possible in the drive train of the motor vehicle. In the ideal case of the complete vibration compensation, only the vibrating mass 26 and the resilient body 27 connected with the vibrating mass 26 and with the carrier flange 23 are excited into vibrations, whereas the cardan shaft rotates free of vibrations. It is then effectively precluded that, for example, the rear axle subframe (not shown) carrying the driven rear axle of the motor vehicle, which is supported at the vehicle floor by way of rubber bearings, is excited by vibrations of the cardan joint 21 into vibrations at its natural frequency, which are transmitted as structure-borne noise or body droning onto the vehicle floor, from which result vibrations in the vehicle interior that are sensed as disturbing air noises. Typical natural vibrations of such a rear axle subframe of conventional V-shaped construction, whose resonant excitation is to be far-reachingly avoided, are, on the one hand, a translational vibration translatory with respect to the vehicle floor, in which the rear axle subframe vibrates as a whole against the vehicle floor, and on the other, a flexural vibration of the rear axle subframe, in which the latter itself is subjected to a vibrational deformation. Typical values of the resonant frequency of the translatory vibration of the rear axle subframe which is adapted to be excited in particular by torsional vibrations of the cardan shaft, are between about 30 and 60 Hz whereas typical values of the resonant frequency of the flexural vibration of the rear axle subframe which are adapted to be excited in particular by flexural vibrations of the cardan shaft, are at about 150 Hz.

Since a vibration absorber develops its optimum damping effect when its natural vibration coincides with the type and frequency of the vibration to be combatted, the vibration absorber 22 should possess in the case selected for explanation and occurring frequently in practice, a resonant frequency $f_t$ for torsional vibrations of about 60 Hz and a resonant frequency $f_r$ for flexural, respectively, radial vibrations of about 150 Hz.

Figure 2:
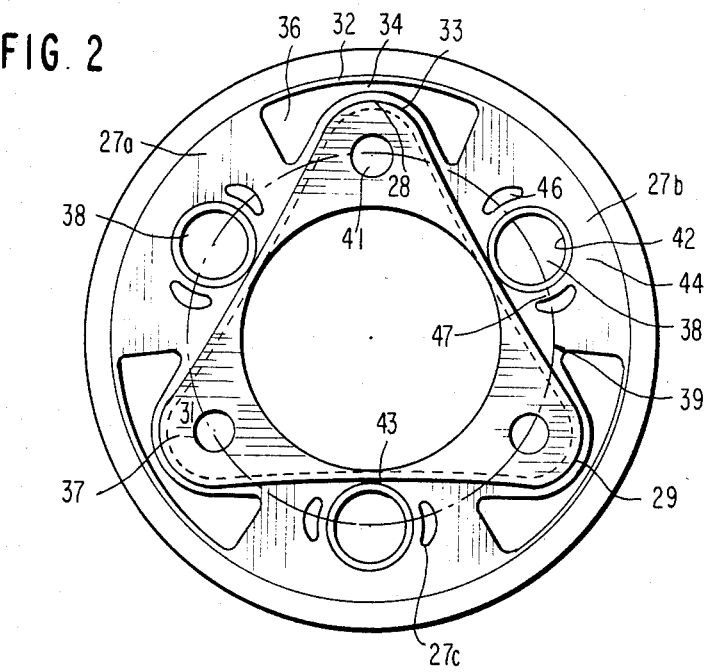
FIG. 2 is an end elevational view of the vibration absorber of the installation according to FIG. 1.
Figure 3:
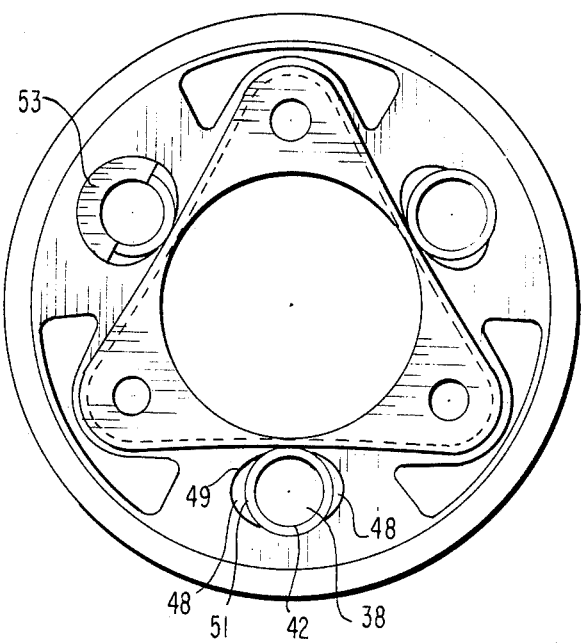
FIG. 3 is an end elevational view, similar to FIG. 2, of a further embodiment of a vibration absorber according to the present invention with prismatic carrier body which can be used within the scope of the present invention.

In order to realize this extreme resonant frequency ratio $f_r/f_t$ of at least 2.5, the vibration absorber 22 according to the present invention has the construction as shown in the two special embodiments of FIGS. 2 and 3.

In end elevational view, for example, of FIG. 2, the resilient body 27 consisting of rubber or other suitable elastomer, has three parts 27a, 27b and 27c of approximately ring-segmental shape, which hang together pairwise within the area of the rounded-off corners of the carrier flange, respectively, of the edges of its prismatic carrier body 24 by way of a thin web 32 on the side of the vibrating mass and by way of a thin web 33 on the side of the carrier body. Slots 34 which remain between these webs 32 and 33 and which extend in the circumferential direction over a sector angle of about 55°, have triangularly shaped enlargements 36 at their corners and have a clearance at their narrowest place within the area of the corners 28, 29 and 31 of the carrier flange 33, which is slightly larger than the vibration amplitudes of the cardan shaft 11 that occur normally. The frequency position of the torsional and flexural natural vibrations of the vibration absorber 22 can be intentionally influenced by such slots 34 and the configuration of their enlargements 36, even though only within relative narrow limits. Bores 38 extending through the resilient body 27 in the axial direction are provided in the solid sector areas of the resilient body parts 27a, 27b and 27c arranged between the slots 34; the axes of the bores 37 lie on the same bore circle 39 as the axes of the carrier flange bores 41, through which extend the bolts 19 provided at the coupling disk 14 for the fastening of the carrier flange and the cardan joint 11. The bolts 18 provided for the fastening of the transmission output shaft 12 at the coupling disk 14 can be extended during the assembly through the bores 38 of the resilient body 27, by means of which the resonant behavior of the vibration absorber 22 can also be intentionally influenced.

Bushes or sleeves 42 of cylindrical shape and made from steel or any other suitable rigid material are pressed-in into these bores 38 as stiffening or reinforcing elements, whereby thin bridges 43 having a thickness of about 1 to about 1.5 mm. remain between the carrier body 24 of the carrier flange 23 and the stiffening sleeves 42 and more substantial bridges 44 having a minimum thickness of about 7 mm. remain between the stiffening sleeves 42 and the annular-shaped vibrating mass 26. A considerable stiffening of the spring body 27 is achieved by the stiffening sleeves 42 which are effective in particular in the radial direction, whence the desired high resonant frequency $f_r$ of the vibration absorber 22 for flexural vibrations of about 150 to about 160 Hz is attained.

On the other hand, in order to keep the resonant frequency $f_t$ of the vibration absorber 22 for torsional vibrations at a desired low value of about 50 to about 60 Hz, further through-apertures 46 are provided in the illustrated embodiment within the resilient body 27 on both sides of the bores 38 fitted with the sleeves 42, whereby the further bores 46 reduce the stiffness of the resilient body 27 in the tangential direction, i.e., in the direction of torsional vibrations. By a suitable selection of the size and shape of these apertures 46, the frequency position of the resonant frequency for torsional vibrations of the vibration absorber 22 can be intentionally influenced within wide limits and can be adjusted to the low value of about 50 to about 60 Hz notwithstanding the stiffening elements 42 provided in the bores 38. With this value of the resonant frequency $f_t$ for torsional vibrations, a resonant frequency ratio $f_r/f_t$ of 2.5 is attainable without difficulty with the construction of the vibration absorber 22 according to FIG. 2.

In the embodiment according to FIG. 2, the additional apertures 46 have an approximately reniform-shaped interior cross section whereby thin webs 47 of the elastic spring body 27 remain between these apertures 46 and the bores 38 provided with the stiffening elements 42, which webs 47 laterally clamp around the stiffening sleeves 42.

In the alternative, laterally widened bulges or regions 48 having an approximately crescent-shaped internal cross section may be provided at the bores 38 containing the stiffening elements 42, as illustrated in FIG. 3, whose edges 49 smoothly adjoin one another on the side of the carrier flange tangentially with respect to the outer surface 51 of the stiffening sleeves 42.

In a particular embodiment of the type illustrated in FIG. 3, the cylindrical stiffening sleeves 42 have an outer diameter of 24 mm. and are constructed as steel tubes with a wall thickness of 1.5 mm. Corresponding stiffening sleeves 42 of aluminum should have a wall thickness of about 3 mm. The maximum internal width of the crescent-shaped lateral widened bulges or regions 48 amounts to about 3 to about 5 mm., and the radius of curvature of the edges 49 delimiting these widened regions 48, respectively, of the surfaces of the resilient body 27 amounts to about 11.5 mm. The thicknesses of the bridges remaining between the carrier body 24 and the stiffening sleeves 42 amount, as in the embodiment according to FIG. 2, to about 1 to about 1.5 mm., and the minimum thickness of the bridges 44 remaining between the stiffening sleeves 42 and the annular vibrating mass 26 amounts to about 7 mm.

The reniform apertures 46 provided in the embodiment according to FIG. 1, which are offset laterally by the webs 47 with respect to the bores 38, may be realized with similar dimensions as those of the crescent-shaped lateral bulges or widened regions 48.

The moveability of the stiffening sleeves 42 in the sense of a rolling-off movement at the carrier flange 24 is considerably increased by the apertures 46 according to FIG. 2 and the widened regions 48 according to FIG. 3, which are provided on both sides of each of the bores 38, respectively, the cylindrical stiffening sleeves 42 inserted into the same, with the result that the stiffening sleeves 42 embedded in the resilient body 27 make no significant contribution to the torsional rigidity of the resilient body 27, respectively, 27a, 27b, 27c, even though they represent rigid elements.

It is a prerequisite for the embodiments of vibration-absorbing or vibration damping installations according to the present invention, described hereinabove, that the carrier body 24 has the basic shape of a triangular prism as illustrated in FIGS. 2 and 3, whereby the stiffening sleeves 42 roll off uniformly at the surfaces of the sides of the carrier body 24 in the course of torsional vibrations.

In order to secure the stiffening sleeves 42 against axial displacements within the resilient body 27, inwardly projecting narrow annular ribs 52 may be provided—as illustrated in FIG. 1—at the mouth openings of the bores 38, or as illustrated in the left-hand upper part of FIG. 3, retaining shoulders 53 may be formed integrally with the end faces of the stiffening sleeves 42, which prevent the stiffening elements from working themselves out of the bores 38. It is thereby sufficient if the retaining shoulders 53, as illustrated, extend only over a portion of the sleeve circumference, for example, over an outer 180° sector area.

Figure 5:
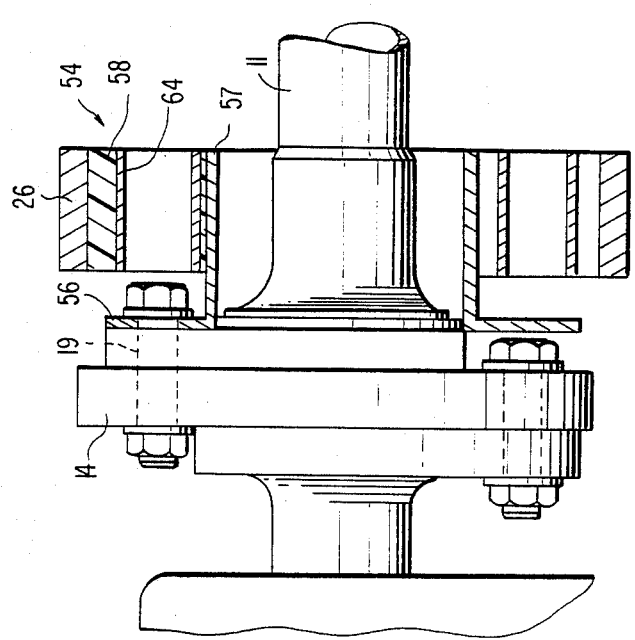
FIG. 5 is an elevational view, partly in axial longitudinal cross section, similar to FIG. 1, of the vibration absorber according to FIG. 4.
Figure 4:
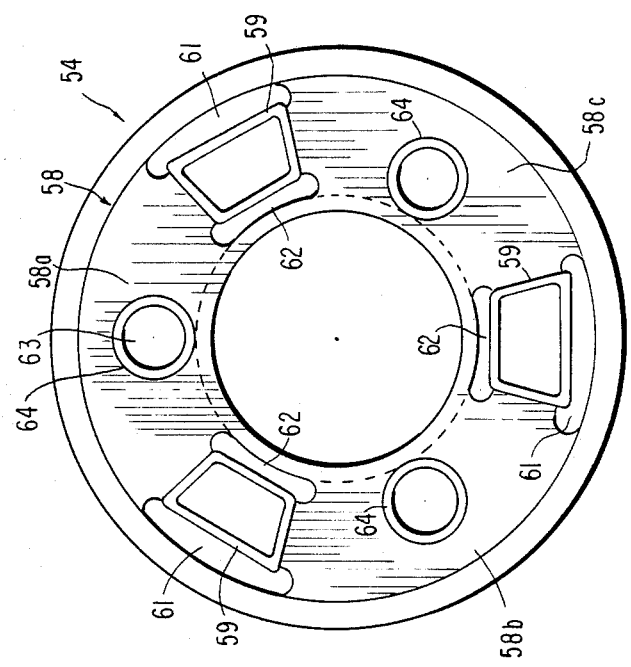
FIG. 4 is an elevational view, similar to FIGS. 2 and 3, of a still further embodiment in accordance with the present invention of a vibration absorber having a carrier body of a cylindrical shape.

A vibration absorber generally designated by reference numeral 54 which can be used within the scope of an installation 10 according to the present invention, may be realized in principle also with the configuration and construction illustrated in the elevational view of FIG. 4 and in the cross-sectional view of FIG. 5. The carrier flange 56 of this vibration absorber or damper 54 has a cylindrical tubularly shaped carrier body 57 and its resilient body generally designated by reference numeral 58 has correspondingly the basic shape of a circular ring.

The resilient body 58 includes in an axial symmetrical arrangement, three ring segments 58a, 58b and 58c which fill out within a respectively 90° sector area, the space between the vibrating mass 26 and the carrier body 57 and adhere at these parts. As viewed in the circumferential direction, these ring segments 58a, 58b and 58c are connected with each other by inherently rigid intermediate members 59 which in the illustrated embodiments are constructed as hollow profile members having a trapezoidally shaped profile cross section; however, they may also be constructed as U-shaped profiles in the radial direction open on one side. The torsional stiffness of the resilient body 58 and therewith the resonant frequency $f_t$ for torsional vibrations of the vibration absorber 58 can be influenced intentionally by these intermediate elements 59 which are arranged between slots 61 on the side of the vibrating mass and slots 62 on the side of the carrier body. The annular segments 58a, 58b and 58c each have a circular through-bore 63, into which are inserted sheet metal sleeves 64 corresponding again in function and construction to the stiffening elements 42, by means of which the radial stiffness of the resilient body 58 and therewith the resonant frequency $f_r$ for radial vibrations of the vibration absorber 54 is adapted to be influenced in a defined manner.

In order to be able to secure the vibration absorber 54 in the arrangement illustrated in FIG. 5 which corresponds to the arrangement of FIG. 1, at the cardan shaft 11, respectively, at the coupling disk 14, the axial length of its carrier body 57 must be larger by about the bolt head thickness of the securing bolt 19 than that of the carrier body 24 of the coupling flange 23 of the vibration absorber 22 according to FIGS. 1 to 3.

While we have shown and described only three embodiments in accordance with the present invention, it is understood that the same is not limited thereto, but is susceptible of numerous changes and modifications as known to those skilled in the art. For example, it is understood that a vibration absorber within the scope of an installation 10 according to the present invention with a cylindrical carrier body may also be realized in such a manner that internal projections are provided at its annular vibrating mass between which are arranged the elastic ring segment-shaped parts of its resilient body. Also with this construction, the carrier body, as explained by reference to FIG. 5, would have to be lengthened somewhat. In exchange thereof, the outer diameter of the vibrating mass could be somewhat reduced with predetermined inertia moment by reason of the enlargement of the vibrating mass conditioned by the projection, which might be of advantage for space reasons. Thus, the present invention is not limited to the details shown and described herein but is susceptible of numerous changes and modifications as known to those skilled in the art, and we therefore do not wish to be limited to the details shown and described herein, but intend to cover all such changes and modifications as are encompassed by the scope of the appended claims.

We claim:

1. An installation for damping vibrations in the drive connection of a motor vehicle comprising a vibration absorber in coaxial arrangement with a shaft of the drive connection, the vibration absorber including an annular mass, a carrier flange adapted to be secured to said shaft, and resilient body means of an elastomeric material for connecting the carrier flange with the annular mass and effecting the vibration-coupling of the annular mass with the shaft, stiffening elements in said resilient body means for influencing in a defined manner the frequencies of the natural vibrations of the vibration absorber by the arrangement thereof within the resilient body means and the configuration thereof, the stiffening elements being constructed as a plurality of generally cylindrical sleeves extending generally parallel to the axial direction of said shaft, each of said plurality of sleeves being arranged between an outer bridge of the resilient body means on the side of the annular mass and an inner bridge of the resilient body means on the side of the carrier flange, aperture means in the resilient body means disposed on both sides of and adjacent to each of the plurality of sleeves, as viewed in the direction of rotation of said shaft for reducing the torsional stiffness of the resilient body means.

2. An installation according to claim 1, wherein said shaft is a cardan shaft coupling the drive unit with a driven axle of the motor vehicle.

3. An installation according to claim 1, wherein the stiffening elements are arranged axially symmetrically with respect to the longitudinal axis of said shaft.

4. An installation according to claim 1, wherein the stiffening elements are pressed into apertures of the resilient body means.

5. An installation according to claim 4, wherein means are provided for securing each of the plurality of sleeves against axial displacement.

6. An installation according to claim 5, wherein said means for securing includes shoulders formed integrally with end faces of each of the plurality of sleeves.

7. An installation according to claim 5, wherein said means for securing includes annular flange-shaped parts of the resilient body means overlapping ring-shaped end faces of each of the plurality of sleeves.

8. An installation according to claim 1, 2, 3, 4, 5, 6 or 7, wherein the aperture means in the resilient body means disposed on both sides of and adjacent to each of the plurality of sleeves, have a reinform internal cross section.

9. An installation according to claim 4, 5, 6 or 7, wherein the aperture means disposed on both sides of and adjacent to each of the plurality of sleeves are constructed as lateral widened regions of a respective aperture in the resilient body means for receiving a corresponding stiffening element.

10. An installation according to claim 9, wherein the lateral widened regions of each respective aperture in the resilient body means for receiving each of the plurality of sleeves smoothly adjoin one another on the side of the carrier flange means tangentially with respect to the outer surface of the stiffening elements.

11. An installation for the vibration damping in motor vehicles, according to claim 1, 2, 3, 4, 5, 6 or 7, wherein the carrier flange of the vibration absorber includes a carrier body of substantially cylindrical and tubular shape, the resilient body means including annular segment-shaped resilient elements of an elastomeric material connecting the annular mass and the carrier body, an intermediate body portion connecting the resilient elements, said intermediate body portion being form-rigid and arranged in the radial direction between slots, and the sleeve-shaped stiffening elements being inserted into the annular segment-shaped resilient elements.

* * * * *